United States Patent
Tominaga et al.

[11] Patent Number: 5,891,542
[45] Date of Patent: Apr. 6, 1999

[54] OPTICAL RECORDING MATERIAL, AND OPTICAL RECORDING MEDIUM

[75] Inventors: Junji Tominaga, Tsukuba; Takashi Kikukawa, Nagano; Isamu Kuribayashi, Nagano; Makoto Takahashi, Nagano, all of Japan

[73] Assignee: TDK Corporation, Tokyo, Japan

[21] Appl. No.: 982,499

[22] Filed: Dec. 2, 1997

[30] Foreign Application Priority Data

Dec. 10, 1996 [JP] Japan .................................. 8-346749

[51] Int. Cl.⁶ ....................................................... B32B 3/00
[52] U.S. Cl. ........................ 428/64.1; 428/64.2; 428/64.4; 428/64.5; 428/688; 428/697; 428/913; 430/270.12; 430/495.1; 430/945; 369/283; 369/288
[58] Field of Search .................................. 428/64.1, 64.2, 428/64.4, 64.5, 642, 688, 697, 913; 430/270.12, 495.1, 945; 369/283, 288

[56] References Cited

U.S. PATENT DOCUMENTS

| | | | |
|---|---|---|---|
| 4,947,372 | 8/1990 | Koshino et al. | 365/106 |
| 5,058,061 | 10/1991 | Koshino et al. | 365/106 |
| 5,385,806 | 1/1995 | Ohno et al. | 430/270.1 |

FOREIGN PATENT DOCUMENTS 7-141693  6/1995  Japan .

Primary Examiner—Elizabeth Evans
Attorney, Agent, or Firm—Laubscher & Laubscher; R. J. Lasker

[57] ABSTRACT

One object of the invention is to achieve a phase change type optical recording medium having high degree of modulation and recording sensitivity, and another object of the invention is to achieve a phase change type optical recording medium having already stable write/read characteristics at the time of the first overwriting. The optical recording medium comprises a recording layer made up of an optical recording material containing given amounts of In, Ag, Te and Sb. In one Raman spectrum embodiment of the optical recording there are a scattering peak I-1 having a Raman shift in a range of 113 to 117 cm$^{-1}$ and a scattering peak I-2 having a Raman shift in a range of 123 to 127 cm$^{-1}$, said scattering peak I-2 being larger in half-width than said scattering peak I-1. In another Raman spectrum embodiment, there are a scattering peak II-1 having a Raman shift in a range of 105 to 125 cm$^{-1}$ and a scattering peak II-2 having a Raman shift in a range of 140 to 160 cm$^{-1}$, said scattering peak II-1 being higher in intensity than said scattering peak II-2.

5 Claims, 5 Drawing Sheets

OPTICAL RECORDING MATERIAL, AND OPTICAL RECORDING MEDIUM

BACKGROUND OF THE INVENTION

The present invention relates to a phase change type optical recording material, and an optical recording medium using such a recording material.

Highlight is recently focused on optical recording media capable of recording information at a high density and erasing the recorded information for overwriting. One typical rewritable optical recording medium is of the phase change type wherein a laser beam is directed to the recording layer to change its crystallographic state whereupon a change of reflectance by the crystallographic change is detected for reading. Optical recording media of the phase change type are of great interest since they can be overwritten by modulating the intensity of a single light beam and the optical system of the drive unit used for their operation is simple as compared with magneto-optical recording media.

Most optical recording media of the phase change type use Ge-Te base materials which provide a substantial difference in reflectance between crystalline and amorphous states and have a relatively stable amorphous state. In recent years, it has been proposed to use compounds known as chalcopyrites.

Chalcopyrite compounds are extensively investigated as compound semiconductor materials, and applied to solar batteries and the like. The chalcopyrite compounds are composed of Ib-IIIb-VIb$_2$ or IIb-IVb-Vb$_2$ as expressed in terms of the Groups of the Periodic Table and have two stacked diamond structures. The structure of chalcopyrite compounds can be readily determined by X-ray structural analysis and their basic characteristics are described in Physics, Vol. 8, No. 8 (1987), page 441, Denki Kagaku (Electrochemistry), Vol. 56, No. 4 (1988), page 228, and other literature.

Among the chalcopyrite compounds, AgInTe$_2$ is known to be applicable as a recording material by diluting it with antimony or Sb or bismuth or Bi. The resulting optical recording media are generally operated at a linear velocity of about 7 m/s. See JP-A's 3-240590, 3-99884, 3-82593, 3-73384 and 4-151286.

In addition to these phase change type optical recording media using chalcopyrite compounds, JP-A's 4-267192, 4-232779 and 6-166268 disclose phase change type optical recording media wherein an AgSbTe$_2$ phase forms upon the crystallization of a recording layer.

For the phase change type optical recording medium, a recording layer is usually formed using vacuum deposition equipment or the like, and so is in an amorphous state just after formation. The recording layer must be crystallized by an operation generally known as initialization before the recording media can be utilized as rewritable media. In the initialization operation the recording layer is crystallized by heating, and slow cooling. After initialization, the recording layer is irradiated with rewriting or overwriting laser beam, whereupon the recording layer melts at a spot with recording power applied thereon. Then, the temperature of the region drops quickly so that the region becomes substantially amorphous or microcrystalline to form a recorded mark having a lowered reflectance. On the other hand, no change is found in a region with erasing power applied thereon, so that the reflectance of the region can be on much the same level as obtained upon initialization. When it is desired to rewrite the recorded information, recording power is applied on another region of the recording layer which is to become a new recorded mark while erasing power is applied on the remaining regions. Whether the recording material is crystalline or amorphous (microcrystalline) before irradiation, all regions with recording power applied thereon provide recorded marks of amorphous or microcrystalline nature while all regions with erasing power applied thereon become crystalline, so that overwrite recording can be done.

Among basic characteristics the phase change type optical recording medium should have, there are the degree of modulation, recording sensitivity, etc. Insofar as the change phase type optical recording medium forming an AgSbTe$_2$ phase is concerned, however, nothing is known about what crystallographic structure of a recording layer makes these basic properties satisfactory; it is still difficult to make sure of an optical recording medium well improved in terms of such properties.

Prior art phase change type recording media require to repeat rewriting several times after initialization until a constant rate of erasure is reached. In most cases, rewriting is generally repeated about ten times before performance rating is carried out. The reason why the rate of erasure of the phase change type optical recording medium with the formation of an AgSbTe$_2$ phase remains unstable upon rewriting immediately after initialization appears to be that the formation of an AgSbTe$_2$ or In-Te crystalline phase is incomplete, although details of the mechanism involved have yet to be clarified.

One object of the present invention is to achieve a phase change type optical recording medium having high degree of modulation and recording sensitivity. Another object of the present invention is to achieve a phase change type optical recording medium having already stable write/read characteristics at the time of the first rewriting.

SUMMARY OF THE INVENTION

Such objects are achievable by the inventions defined below as (1) to (4).

(1) An optical recording material which has a composition, in atomic ratio, represented by

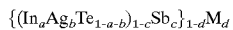

$$\{(In_aAg_bTe_{1-a-b})_{1-c}Sb_c\}_{1-d}M_d$$

where M is at least one element selected from the group consisting of hydrogen or H, silicon or Si, carbon or C, vanadium or V, tungsten or W, tantalum or Ta, zinc or Zn, titanium or Ti, cerium or Ce, terbium or Tb, and yttrium or Y, a=0.1 to 0.3, b=0.1 to 0.3, c=0.5 to 0.8, and d=0 to 0.05, and wherein, in a Raman spectrum thereof, there are a scattering peak I-1 having a Raman shift in a range of 113 to 117 cm$^{-1}$ and a scattering peak I-2 having a Raman shift in a range of 123 to 127 cm$^{-1}$, said scattering peak I-2 being larger in full width at half maximum (FWHM) or half-width than said scattering peak I-1.

(2) The optical recording material of (1), wherein, in the Raman spectrum, there is further a scattering peak I-3 having a Raman shift in a range of 170 to 185 cm$^{-1}$, with an intensity of said scattering peak I-3 being up to 0.25 times those of said scattering peaks I-1 and I-2.

(3) An optical recording material which has a composition, in atomic ratio, represented by

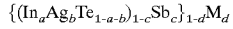

$$\{(In_aAg_bTe_{1-a-b})_{1-c}Sb_c\}_{1-d}M_d$$

where M is at least one element selected from the group consisting of hydrogen or H, silicon or Si, carbon or C, vanadium or V, tungsten or W, tantalum or Ta, zinc or Zn, titanium or Ti, cerium or Ce, terbium or Tb, and yttrium or Y, a=0.1 to 0.3, b=0.1 to 0.3, c=0.5 to 0.8, and d=0 to 0.05, and wherein, in a Raman spectrum thereof, there are a scattering peak II-1 having a Raman shift in a range of 105 to 125 cm$^{-1}$ and a scattering peak II-2 having a Raman shift in a range of 140 to 160 cm$^{-1}$, said scattering peak II-1 being higher in intensity than said scattering peak II-2.

(4) An optical recording medium comprising a recording layer formed of an optical recording material as recited in any one of (1) to (3).

According to the present invention, the aforesaid objects are achieved by using an optical recording material wherein, in a Raman spectrum thereof, there are such given scattering peaks as defined above. Specifically, one aspect of the present invention achieves an optical recording material having high degree of modulation and recording sensitivity by making the half-width of the scattering peak I-2 coming from $AgSbTe_2$ larger than that of the scattering peak I-1 coming from $Sb_2Te_3$. According to another aspect of the present invention, there is achieved an optical recording material having high degree of modulation and showing already stable write/read characteristics at the time of the first rewriting, wherein, in a Raman spectrum thereof, there are substantially only two scattering peaks (II-1 and II-2 referred to above) coming from Sb-Sb, and the scattering peak II-1 is higher in intensity than the scattering peak II-2.

As can be understood from the second aspect of the present invention, the full crystallization of Sb is needed for obtaining already stable write/read characteristics at the time of the first rewriting, and the present invention is the first to find and propose this requirement. It has so far been believed that for this, only the full presence of an $AgSbTe_2$ or In-Te crystalline phase is needed, as already noted.

BRIEF DESCRIPTION OF THE DRAWINGS

These and further features of the present invention will be apparent with reference to the following description and drawings, in which.

BEST MODE FOR CARRYING OUT THE INVENTION

Figure 1:
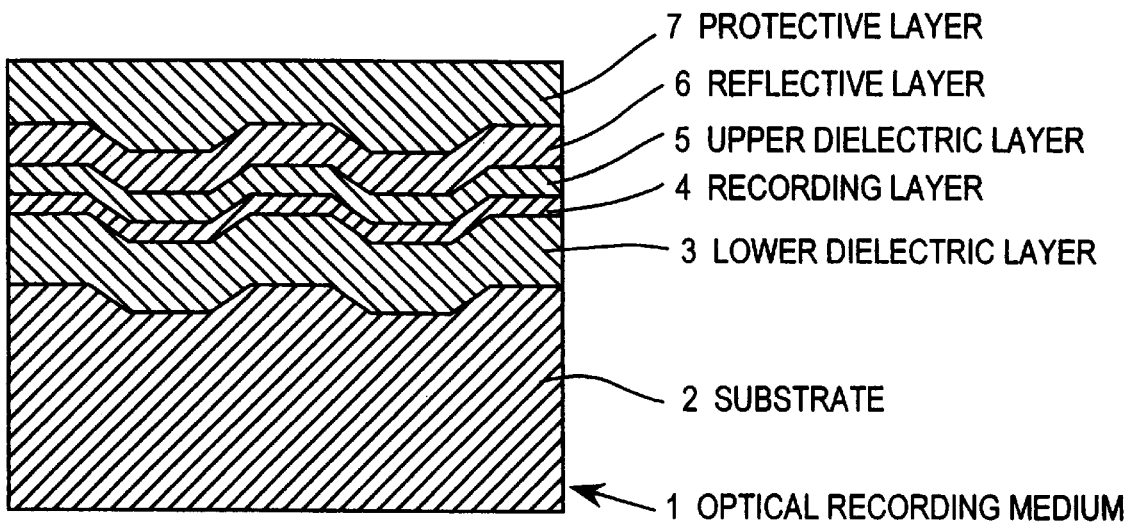
FIG. 1 is a sectional schematic illustrative of a portion of an optical recording medium according to the present invention.

Some preferable embodiments of the present invention will now be explained at great length.

Recording Layer

A recording layer of the optical recording medium according to the present invention is made up of the following optical recording material.

In the present invention, the atomic ratio of elements constituting the optical recording material is given by the following formula:

$\{(In_aAg_bTe_{1-a-b})_{1-c}Sb_c\}_{1-d}M_d$

Preferably, the letters a, b, c and d fall in the ranges:
  a=0.1 to 0.3
  b=0.1 to 0.3
  c=0.5 to 0.8
  d=0 to 0.05
More preferably, the letters a, b, c and d fall in the ranges:
  a=0.11 to 0.28
  b=0.15 to 0.28
  c=0.55 to 0.65
  d=0.005 to 0.05

At too small a value of a, the indium or In content of the recording material becomes relatively too small. This in turn recorded marks become less amorphous, resulting in a drop of the degree of modulation, and a reliability drop as well. At too large a value of a, on other hand, the In content of the recording material becomes relatively too high. This in turn makes the reflectance of regions other than the recorded marks low, resulting in a drop of the degree of modulation.

At too small a value of b, the silver or Ag content of the recording material becomes relatively too small. This in turn makes the recrystallization of recorded marks difficult and so renders repeated overwriting difficult. At too large a value of b, on the other hand, the Ag content of the recording material becomes relatively high, and so excessive Ag diffuses independently into an Sb phase at the time of recording or erasing. This in turn makes the robustness of the recording material upon rewriting low, and renders the stability of both recorded marks and crystalline portions low, resulting a reliability drop. In other words, the crystallization of the recorded marks is promoted during storage at high temperatures, often resulting in drops of C/N and degree of modulation. Repetition of recording may often facilitate deterioration of C/N and degree of modulation.

When the value of a+b is too small, a tellurium or Te phase is formed by excessive Te. The Te phase makes erasing difficult because it slows down the rate of crystal transition. When the value of a+b is too large, on the other hand, it is difficult to make the recording layer amorphous, leading to a possibility that signals may not be recorded.

At too small a value of c, there is an increased reflectance difference concomitant with a phase change, but difficulty is involved in easing because of an abrupt crystal transition rate drop. At too large a value of c, on the other hand, there is a decreased degree of modulation due to a decreased reflectance difference incidental to a phase change.

In the aforesaid formula, M represents at least one element selected from the group consisting of H, Si, C, V, W, Ta, Zn, Ti, Ce, Tb and Y. The element M is effective for improving rewriting robustness, more specifically reducing the drop of the rate of erasure due to repeated rewriting, and contributes to a reliability improvement under unfavorable conditions, e.g., high temperature and humidity conditions. Of these elements, it is preferable to use at least one of V, Ta, Ce and Y because their such effects are strong. Particular preference is given to at least one of V and Ta, with V being most preferred.

When the value of d representing the content of the element M is too large, no sufficient degree of modulation is obtainable because of a decreased reflectance difference concomitant with a phase change. When the value of d is too small, the effect of the element M added becomes slender.

It is preferred that the recording material consist essentially of Ag, Sb and In, and the element or elements M added if required. In the practice of the present invention, however, it is acceptable that the silver may be partially replaced by gold or Au, the antimony may be partially replaced by bismuth or Bi, the tellurium may be partially replaced by selenium or Se, and the indium may be partially replaced by aluminum or Al and/or phosphorus or P.

The percent replacement of Ag by Au is preferably up to 50 at %, and more preferably up to 20 at %. At too high a percent replacement, recorded marks are susceptible to crystallization, leading to a reliability drop at high temperatures.

The percent replacement of Sb by Bi is preferably up to 50 at %, and more preferably up to 20 at %. Too high a percent replacement causes the recording layer to have an increased coefficient of absorption, resulting in a reduction of the interference effect of light. This in turn makes the reflectance difference between crystalline and amorphous portions and hence the degree of modulation low, so failing to obtain high C/N.

The percent replacement of Te by Se is preferably up to 50 at %, and more particularly up to 20 at %. Too high a percent replacement causes the rate of crystal transition to become too low to obtain any sufficient rate of erasure.

The percent replacement of In by Al and/or P is preferably up to 40 at %, and more preferably up to 20 at %. Too high a percent replacement causes the stability of recorded marks to become low with a reliability drop. It is noted that Al and P may be used at any desired proportion.

It is noted that, after repeated rewriting, the recording material has a coefficient of absorption k of about 3.3 in a crystalline state, and about 2.2 in a microcrystalline or amorphous state.

The recording material may contain other elements such as copper or Cu, nickel or Ni, zinc or Zn, iron or Fe, oxygen or O, nitrogen or N, and carbon or C in the form of trace impurities, although the total content thereof should preferably be up to 0.05 at %.

The composition of the recording material may be determined by electron probe microanalysis (EPMA), X-ray microanalysis, ICP, or the like.

The recording layer has a thickness of preferably 95 to 500 Å, and more preferably 130 to 300 Å. Too thin a recording layer makes the growth of a crystalline phase difficult, and so renders a reflectance change incidental to a phase change insufficient. Too thick a recording layer, on the other hand, causes a large amount of silver to diffuse in the recording layer in a thickness direction thereof during the formation of recorded marks. This in turn makes the proportion of silver diffusing in a longitudinal direction of the recording layer low, resulting in a drop of the reliability of the recording layer. Too thick a recording layer gives rise to drops of both reflectance and degree of modulation, as already noted.

Raman spectral analysis of the recording material

A general aspect of the principle of Raman spectral analysis is explained below.

Scattering light obtained upon incidence of monochromatic light such as laser light on a sample contains, in addition to light having the same frequency $v_o$ as that of the incident light, light having a frequency $v_o \pm v_i$. The scattering light having the same frequency as that of the incident light is obtained by Rayleigh scattering while scattering light having a different frequency is by the Raman effect. The Raman effect manifest itself by the absorption of a portion of photons' energy in a sample material or the application of the energy of the sample material on photons. This energy includes information regarding the rotation, vibrational level, etc. of atoms or molecules. The spectrum of light scattered in the Raman effect is called a Raman spectrum. Raman lines of frequency $v_o - v_i$ are called Stokes lines while Raman lines of frequency $v_o + v_i$ are called anti-Stokes lines. Generally speaking, the Stokes lines are larger in intensity than the anti-Stokes lines. The abscissas of the Raman spectrum is called a Raman shift where a difference $v_i$ in frequency between the Raman scattering light and the incident light is calculated as a wave number.

Raman scattering includes a two-photon process in view of quantum mechanics; that is, Raman scattering light is generally much fainter than the incident light, and so is very difficult to detect. For this reason, Raman spectral analysis has so far been hardly applied to phase change type optical recording materials. In this regard, however, it is noted that JP-A 7-141693 discloses results of Raman spectral analysis of a phase change type recording material made up of an alloy containing Ge and Te, specifically alloys GeSbTe, GeSnTe, and GeInTe. However, the phase change type recording material set forth therein is poor in the rate of erasure upon high-speed recording, and is susceptible to large jitters as well. In the present invention, therefore, In-Ag-Te-Sb base alloys have been investigated by Raman spectral analysis for the purpose of achieving ever-higher performance.

Figure 4:
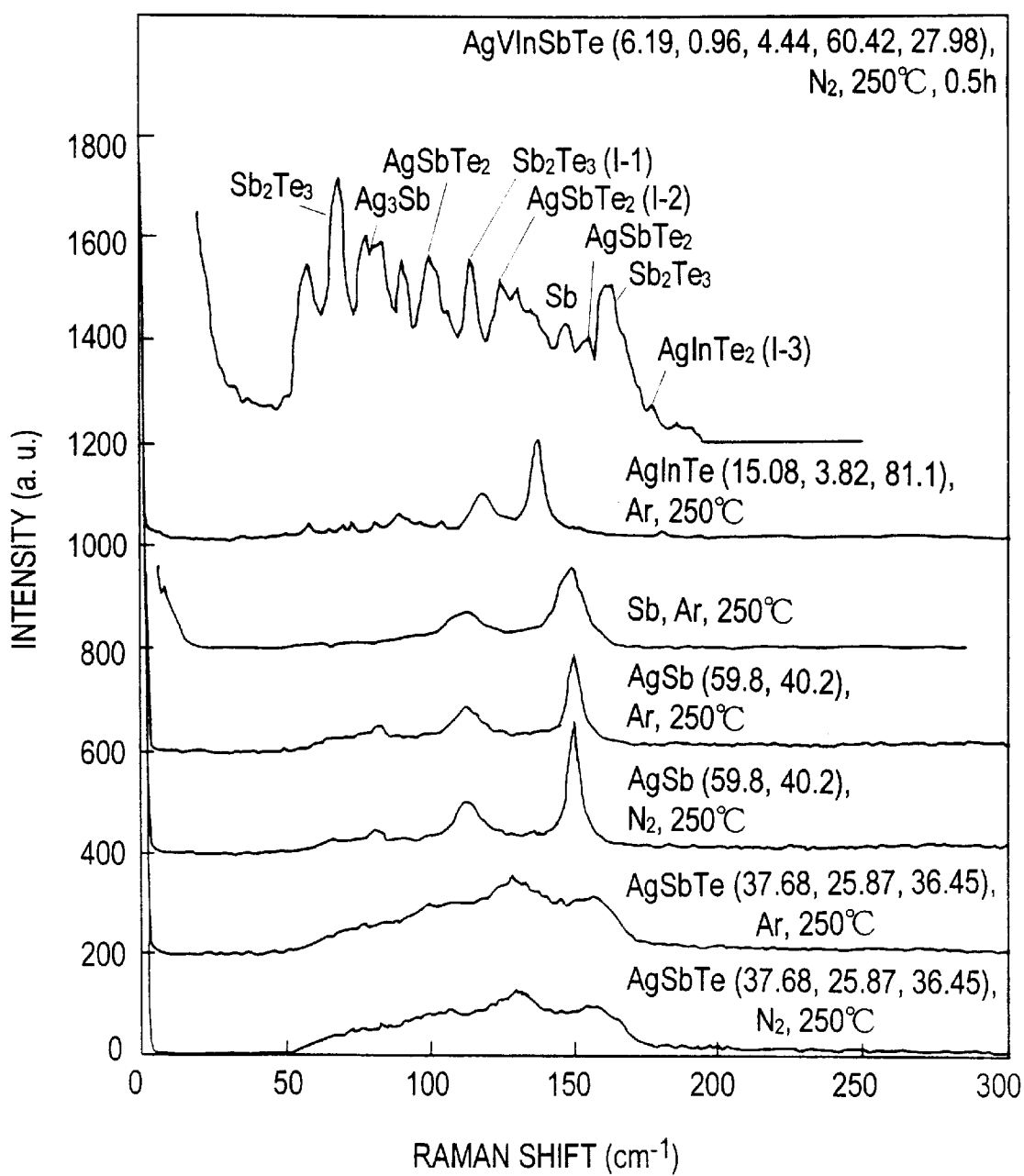
FIG. 4 shows a Raman spectrum of an optical recording material according to the present invention.

In the Raman spectrum of one optical recording material according to the first embodiment of the present invention, there are a scattering peak I-1 having a Raman shift in the range of 113 to 117 $cm^{-1}$ and a scattering peak I-2 having a Raman shift in the range of 123 to 127 $cm^{-1}$, as can be seen from FIG. 4.

In addition to the Raman spectrum of one thin film having an In-Ag-Te-Sb-V base composition, FIG. 4 shows reference Raman spectra of thin films composed of Ag-Sb-Te, Ag-Sb, Sb, and Ag-In-Te, respectively. The inventors have conducted Raman spectral analyses of various compositions to identify scattering peaks in the In-Ag-Te-Sb base compositions according to the present invention. As a result, it has been found that the scattering peak I-1 comes from $Sb_2Te_3$ and the scattering peak I-2 comes from $AgSbTe_2$.

In the first embodiment of the present invention, the half-width of scattering peak I-2 is larger than that of scattering peak I-1. By use of an optical recording material having the aforesaid composition and such a Raman spectrum as defined above, it is possible to achieve an optical recording medium having high recording sensitivity and degree of modulation. However, if the magnitudes of half-width are reversed in these scattering peaks, there are then drops of both recording sensitivity and degree of modulation. Preferably, the half-width of scattering peak I-2 is at least 1.5 times as large as that of scattering peak I-1. It is noted that the half-width may be determined by approximating measurement data using the Gaussian distribution function, and that for the determination of half-width, the intensity of a spectrum at a wave number of 200 $cm^{-1}$ or more may be regarded as a baseline.

In the first embodiment of the present invention, such a scattering peak as shown in FIG. 4 appears in addition to the aforesaid two scattering peaks. Attached to the scattering peaks shown in FIG. 4 are their corresponding names of atoms, molecules or compounds.

Of these scattering peaks, a scattering peak I-3 found at 170 to 185 $cm^{-1}$ is believed to come from $AgInTe_2$. Preferably, the intensity of this scattering peak I-3 is up to 0.25 times those of both scattering peaks I-1 and I-2. When the intensity of scattering peak I-3 is too large, there is then a noticeable drop of rewriting robustness.

Figure 5:
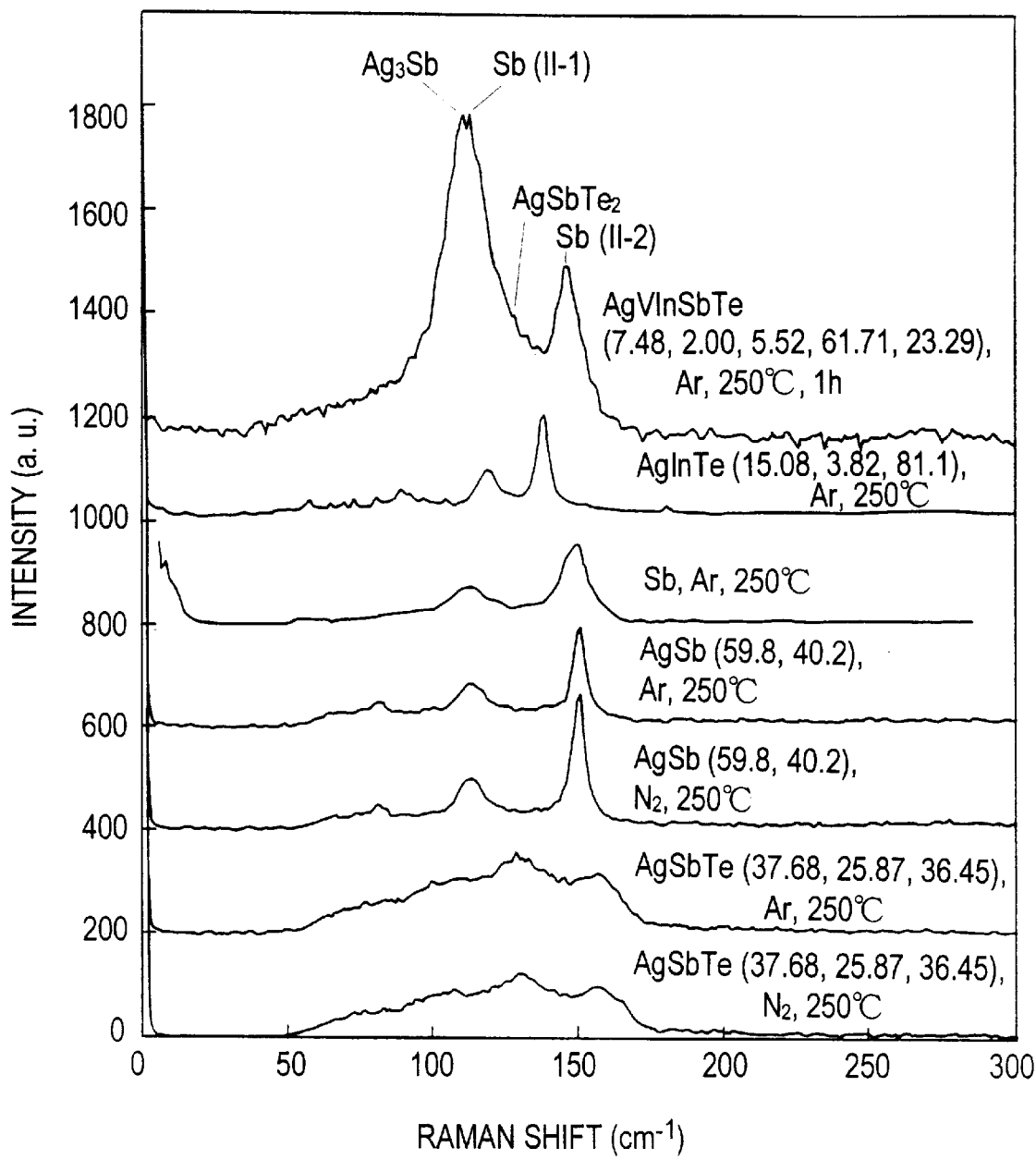
FIG. 5 shows a Raman spectrum of another optical recording material according to the present invention.

In the Raman spectrum of one optical recording material according to the second embodiment of the present invention, there are a scattering peak II-1 having a Raman shift found in the range of 105 to 125 $cm^{-1}$ and a scattering peak II-2 having a Raman shift found in the range of 140 to 160 $cm^{-1}$, as can be seen from FIG. 5 In the Raman spectrum according to this embodiment, it is preferable that major scattering peaks are substantially limited to two such peaks. In some cases, however, a third scattering peak is observed on a frequency side lower than the scattering peak II-1 by about 5 $cm^{-1}$, as can again be seen from FIG. 5.

Like FIG. 4, FIG. 5 also shows reference Raman spectra. Coming from Sb-Sb, the scattering peaks II-1 and II-2 correspond to two scattering peaks of an Sb crystal shown in FIG. 5 for reference purposes. The third scattering peak adjacent to scattering peak II-1 is a peak coming from $Ag_3Sb$. When this third scattering peak is observed, its intensity is substantially on the same level as that of scattering peak II-1. When two scattering peaks having approximately the same intensity are observed in the range of 105 to 125 $cm^{-1}$, it is the scattering peak found on a higher frequency side that corresponds to the aforesaid scattering peak II-1.

In the second embodiment, the intensity of scattering peak II-1 is larger than that of scattering peak II-2. By use of an optical recording material having the aforesaid composition and such a Raman spectrum as defined above, it is possible to achieve an optical recording medium enabling a reflectance change upon rewriting to be already stabilized just after initialization. Preferably, the intensity of scattering peak II-1 is at least 1.3 times as large as that of scattering peak II-2. It is noted that for the measurement of the intensity of scattering peaks, the intensity of a spectrum at a wave number of 200 $cm^{-1}$ or more may be regarded as a baseline.

Referring here to the scattering peaks of the Sb crystal for reference purposes, the scattering peak on a higher frequency side (that corresponding to II-2) is larger in intensity than the scattering peak on a lower frequency side (that corresponding to II-1). In the optical recording material according to the present invention, however, such intensity relation is reversed. This is probably due to the influence on Sb of other atoms, and is a characteristic feature of the second embodiment of the present invention.

In the second embodiment of the present invention, the scattering peak II-1 is shifted on a higher frequency side by the addition of V included in the aforesaid element M, and it is observed that the more the amount of V added, the larger is the amount of shift.

Preparation of the recording layer

In the practice of the present invention, a recording layer made up of the optical recording material having the aforesaid composition is first formed by vapor deposition technologies, preferably sputtering. This recording layer, because of being amorphous as already noted, is then heat-treated for initialization (crystallization). The aforesaid Raman spectrum is obtained after the heat treatment for initialization. Therefore, the heat treatment for initialization should be carried out under such conditions as to obtain the aforesaid Raman spectrum. Sputtering is carried out in an atmosphere containing an inert gas such as an argon gas. The heat treatment for initialization may be done by exposure to flash light or by means of heating. Alternatively, it may be carried out by exposure to laser beam.

Rewriting or overwriting

For rewriting, the optical recording medium of the present invention may be irradiated with light as is the case with the aforesaid conventional phase change type optical recording medium. A pulse form of recording power may be applied on the optical recording medium. If one signal is recorded by at least two exposures to light, the accumulation of heat in recorded marks can then be so reduced that the dilation of the trailing edges of the recorded marks (teardrop phenomena) can be avoided, resulting in an improved C/N. A pulse form of irradiation of the optical recording medium with light also contributes to an improvement in the rate of erasure. Actual values of recording power and erasing power may be experimentally determined. It is understood that the reading laser beam used should be of such low power that the crystallographic state of the recording layer can remain substantially unaffected.

For recording, the linear velocity of the recording layer of the optical recording medium according to the present invention is usually about 0.8 to 20 m/s, and preferably 1.2 to 16 m/s with respect to laser beam.

Insofar as the optical recording medium of the present invention is concernted, the light used for rewriting or reading may be freely selected from a wide wavelength region, for instance, from the range of 100 to 5,000 nm.

Medium architecture

One specific architecture of the optical recording medium according to the present invention is shown in FIG. 1. As shown, an optical recording medium 1 has on a substrate 2 a lower dielectric layer 3, a recording layer 4, an upper dielectric layer 5, a reflective layer 6, and a protective layer 7.

In the optical recording medium of this architecture, the recording layer 4 is irradiated through the substrate 2 with a light beam. It is therefore preferable that the substrate 2 is constructed of a material substantially transparent to the light beam used, for instance, a resinous or glass material. For the resin, it is preferable to use acrylic resin, polycarbonate, epoxy resin, polyolefin or the like. The shape and size of the substrate are not critical although the substrate is generally of disk shape having a thickness of about 0.5 to 3 mm and a diameter of about 50 to 360 mm. If required, the substrate may be provided on its surface with a grooved or other shaped pattern for tracking, and addressing purposes.

The lower dielectric layer 3 is provided to prevent oxidation of the recording layer, and protect the substrate by cutting off heat that may otherwise be conducted from the recording layer to the substrate during recording. The upper dielectric layer 5 is provided to protect the recording layer, and escape the heat remaining in the recording layer by heat conduction after the completion of recording. Both the dielectric layers also contribute to an improved degree of modulation. Each dielectric layer may be made of any desired dielectric material, for instance, various transparent ceramics such as silicon oxides, e.g., $SiO_2$, silicon nitrides, e.g., $Si_3N_4$ and zinc sulfides, e.g., ZnS or mixtures thereof, and various species of glass. It is also preferable to use so-called LaSiON materials containing La, Si, O, and N, so-called SiAlON materials containing Si, Al, O, and N, SiAlON materials further containing Y, or the like. Among these materials, preference is given to those having a refractive index of at least 1.4, especially at least 1.8 in the wavelength range of 400 to 850 nm. In this regard, the aforesaid wavelength range includes a wavelength 780 nm at which state-of-the-art CD players are used, and wavelengths 630–680 nm which are a candidate for the next-generation wavelengths now under investigation. Preferred examples of the dielectric material used are $Si_3N_4$, a mixture of ZnS and $SiO_2$, a mixture of ZnS and $Si_3N_4$, and a mixture of ZnS and $Ta_2O_5$. The lower dielectric layer 3 has a thickness of preferably 500 to 3,000 Å, and more preferably 1,000 to 2,500 Å. By allowing the lower dielectric layer 3 to have such a thickness, it is possible to ensure effective prevention of damage to the substrate upon recording, and to increase the degree of modulation as well. The upper dielectric layer 5 has a thickness of preferably 100 to 300 Å, and more preferably 150 to 200 Å. By allowing the upper dielectric layer 5 to have such a thickness, it is possible to ensure a fast cooling rate, and hence to clearly delimit the edges of recorded marks, resulting in reduced jitters. Such a thickness also results in an increased degree of modulation.

The lower dielectric layer 3 and/or the upper dielectric layer 5 may be made up of two or more dielectric laminae differing in composition, as will be described later.

Each dielectric layer is preferably formed by vapor deposition processes such as sputtering or evaporation.

The reflective layer 6 may be formed of any desired material, usually any high-reflectance metal or alloys of such metals, for instance, Al, Au, Ag, Pt, and Cu, and has preferably a thickness of 300 to 2,000 Å. At a thickness less than the lower limit of this range, it is difficult to obtain any sufficient reflectance. A thickness exceeding the upper limit of the range provide no further improvement in reflectance, and is rather unfavorable in view of cost-effectiveness. Preferably, the reflective layer 6 is formed by vapor phase growth processes such as sputtering or evaporation.

The protective layer 7 is provided to improve scratch resistance and corrosion resistance. Preferably, this protective layer is formed of various organic materials. However, particular preference is given to constructing the protective layer of a radiation-curable type compound or a composition thereof, which is cured with radiation such as electron beams or ultraviolet rays. The protective layer 7 has usually a thickness of about 0.1 to 100 μm, and may be formed by ordinary processes such as spin coating, gravure coating, spray coating, and dipping.

Figure 2:
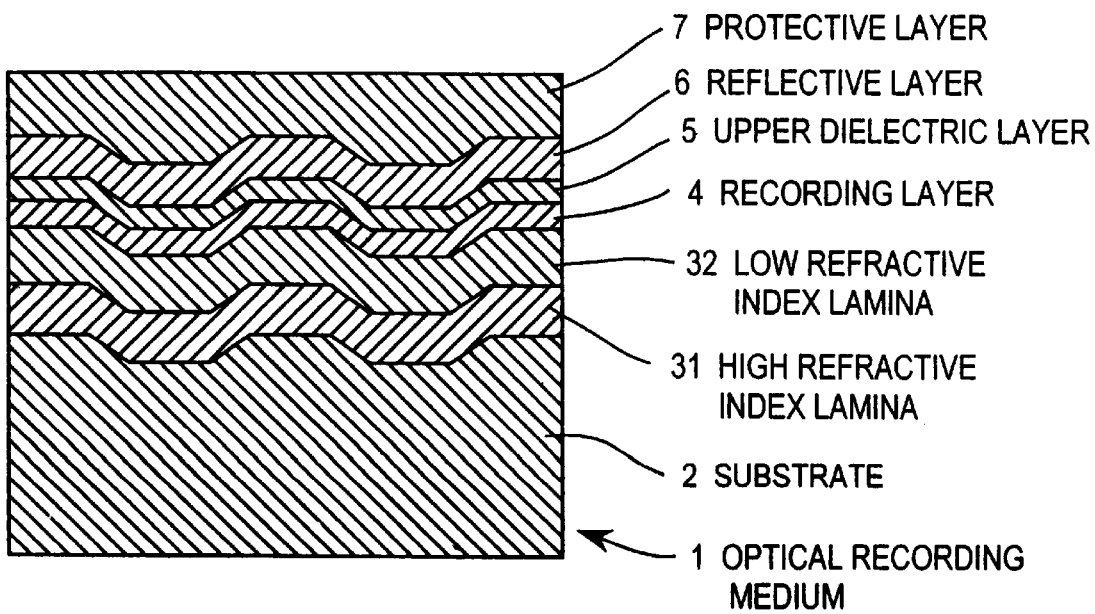
FIG. 2 is a sectional schematic illustrative of a portion of another optical recording medium according to the present invention.
Figure 3:
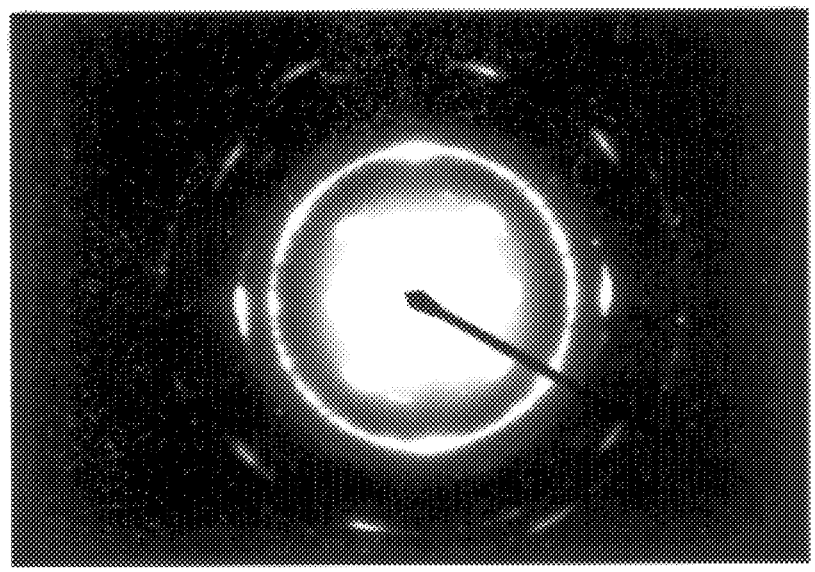
FIG. 3 is an electron diffraction pattern illustrative of a typical crystal structure of a thin film form of optical recording material according to the present invention, said image attached hereto as a substitute drawing.

In another preferred embodiment of the present invention wherein the optical recording medium has an increased reflectance, the lower dielectric layer comprises at least one double-lamina or laminate structure having two dielectric laminae differing in the index of refraction. Preferably in the double-lamina structure, the dielectric lamina having a higher refractive index is located adjacent to the substrate. One preferable arrangement of this embodiment is shown in FIG. 2. As shown, an optical recording medium 1 comprises on a substrate 2 a high refractive index lamina 31, a low reflective index lamina 32, a recording layer 4, an upper dielectric layer 5, a reflective layer 6, and a protective layer 7. In this arrangement, it is the high and low refractive index laminae 31 and 32 that form the double-lamina structure mentioned just above.

For the dielectric material forming the high refractive index lamina 31, it is preferable to select one having a relatively high refractive index from the dielectric materials mentioned above, for instance, one having a refractive index of at least 2 at 400 to 850 nm wavelengths.

For the dielectric material forming the low refractive index lamina 32, it is preferable to use one having a relatively low refractive index, for instance, one having a refractive index of less than 2 at 400 to 850 nm wavelengths. For such a dielectric material, preference is given to $SiO_2$, $MgF_2$, $CaF_2$, and $LiF_2$ or mixtures thereof. It is noted that if two or more such laminate structures are stacked one upon another, it is then possible to achieve further improvements in reflectance. However, the more the laminate structures, the much lower is the degree of modulation. It is therefore preferable to use one or two such laminate structures.

It is preferable that the high refractive index lamina 31 has a thickness of 500 to 1,500 Å, and the low refractive index lamina 32 has a thickness of 300 to 1,500 Å. When two laminate structures are provided, the laminate structure located on the substrate side has a high refractive index lamina of preferably 750 to 900 Å, and more preferably 800 to 850 Å in thickness and a low refractive index lamina of preferably 400 to 500 Å in thickness, and the laminate structure located on the recording layer side has a high refractive index lamina of preferably 750 to 900 Å, and more preferably 800 to 850 Å in thickness and a low refractive index lamina of preferably 1,000 to 1,400 Å, and more preferably 1,200 to 1,300 Å in thickness.

The substrate 2, recording layer 4, upper dielectric layer 5, reflective layer 6 and protective layer 7 are the same as mentioned in conjunction with the arrangement shown in FIG. 1.

EXAMPLE

The present invention will now be explained more specifically with reference to some examples thereof.

EXAMPLE 1 (The First Embodiment)

A sample thin film 1 formed of an optical recording material of 500 nm in thickness was sputtered on a glass substrate. The target used was built up of an Sb target with In, Ag, Te, and V chips attached thereto. By ICP, the sample thin film 1 was found to have a composition (atomic ratio) represented by

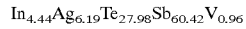
$In_{4.44}Ag_{6.19}Te_{27.98}Sb_{60.42}V_{0.96}$

This composition corresponds to $\{(In_aAg_bTe_{1-a-b})_{1-c}Sb_c\}_{1-d}M_d$ where $a=0.11$, $b=0.16$, $c=0.61$, and $d=0.01$.

Then, the sample thin film 1 was heat-treated at 250° C. for 30 minutes in a nitrogen atmosphere.

By electron diffraction of the crystallographic state of the sample thin film 1 after heat treatment, the presence of Sb, and $AgSbTe_2$ crystallites was confirmed.

Raman spectral analysis of the sample thin film 1 after heat treatment was carried out using an argon laser of 514.5 nm wavelength (with an output of 20 mW). The obtained Raman spectrum is shown in FIG. 4.

For the identification of scattering peaks, FIG. 4 also shows Raman spectra of reference thin films comprising at least one of Ag, Sb and Te. These thin films were formed by sputtering under much the same conditions as those for the sample thin film 1, and then heat-treated under the same conditions as mentioned above.

FIG. 4 indicates that the scattering peak I-1 is observed in the vicinity of 115 $cm^{-1}$ and the scattering peak 1-2 in the vicinity of 125 $cm^{-1}$. FIG. 4 teaches that the half-width (ca. 45 $cm^{-1}$) of scattering peak I-2 is at least twice as large as the half-width (ca. 20 $cm^{-1}$) of scattering peak I-1, and that the intensity of scattering peak I-3 observed in the vicinity of 177 $cm^{-1}$ is up to 0.25 times those of scattering peaks I-1 and I-2.

EXAMPLE 2 (The Second Embodiment)

A sample thin film 2 was formed following Example 1 with the exception that the composition of the thin film was changed to

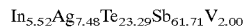
$In_{5.52}Ag_{7.48}Te_{23.29}Sb_{61.71}V_{2.00}$

This composition corresponds to $\{(In_aAg_bTe_{1-a-b})_{1-c}Sb_c\}_{1-d}M_d$ where $a=0.15$, $b=0.21$, $c=0.63$, and $d=0.02$.

Then, the sample thin film 2 was heat-treated at 250° C. as in Example 1; however, the heat-treating time was 1 hour, twice as long as that in Example 1. The heat treatment was conducted in an argon atmosphere.

By electron diffraction of the crystallographic state of the sample thin film 2 after the heat treatment, the presence of Sb, and $AgSbTe_2$ crystallites was confirmed. It was also observed that the sample thin film 2 is higher in the degree of crystallization than the sample thin film 1.

Raman spectral analysis of the sample thin film 2 was conducted as in Example 1. The obtained Raman spectrum of the sample thin film 2 is shown in FIG. 5. For the identification of scattering peaks, FIG. 5 also shows Raman spectra of reference thin films prepared as explained in conjunction with FIG. 4.

FIG. 5 indicates that the scattering peak II-1 is observed in the vicinity of 114 $cm^{-1}$ and the scattering peak II-2 in the vicinity of 147 $cm^{-1}$, and teaches that the intensity of scattering peak II-1 is approximately twice as large as that of scattering peak II-2.

EXAMPLE 3

Sample thin films were formed of optical recording materials differing in the content of V, heat-treated under the same conditions as in Example 2, and then subjected to Raman spectral analysis. Raman spectra of these sample thin films are shown in FIG. 6 together with compositions thereof.

Figure 6:
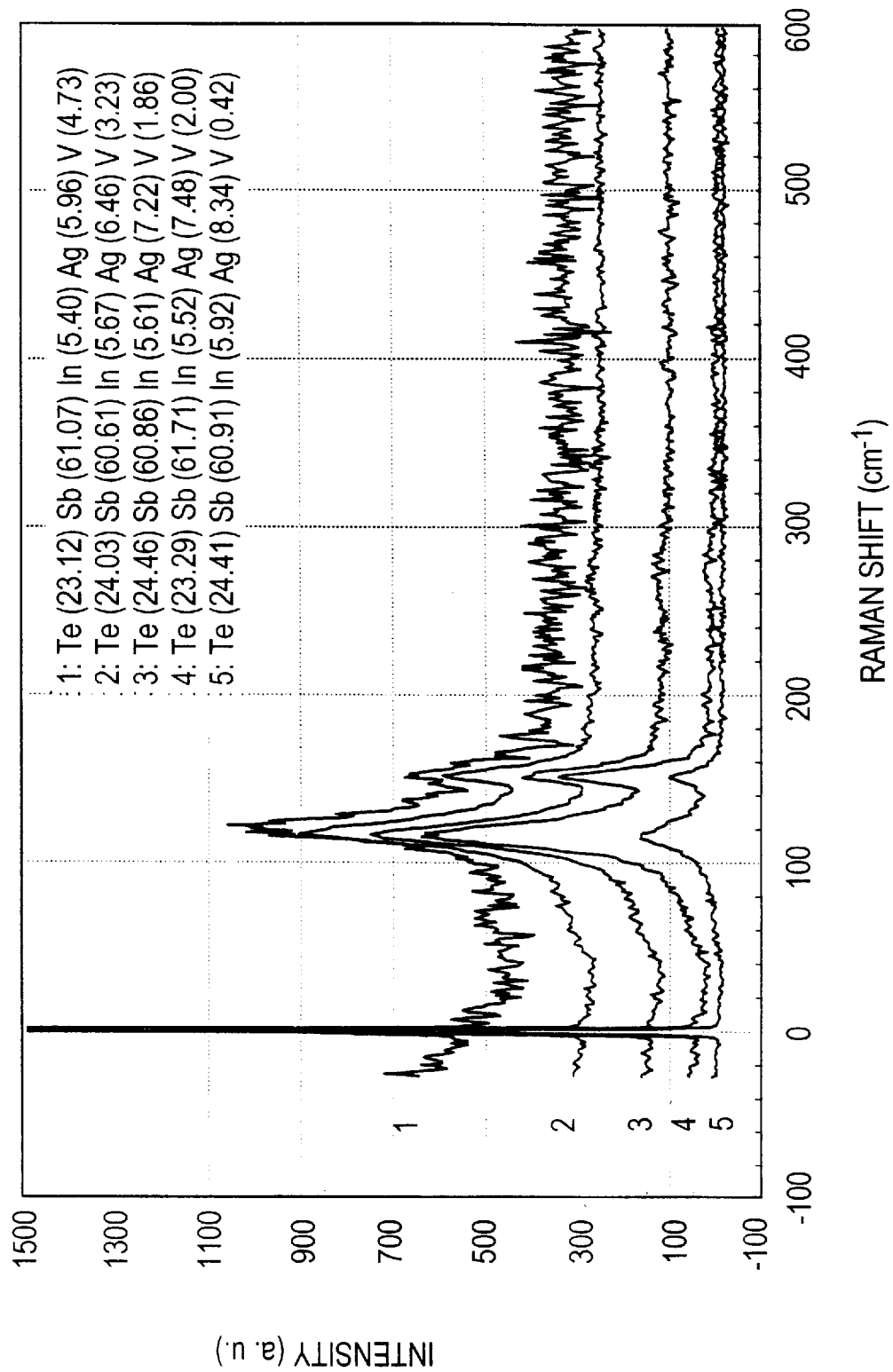
FIG. 6 shows a Raman spectrum of yet another optical recording material according to the present invention.

FIG. 6 indicates that the scattering peak II-1 observed in the vicinity of 115 $cm^{-1}$ wave number is shifted toward a high frequency side with an increase in the content of V.

EXAMPLE 4

A disk form of glass substrate (of 120 mm in diameter and 0.6 mm in thickness) 2 was provided on its surface with grooves by the 2P process using a photoresist. Following this, a lower dielectric layer 3, a recording layer 4, an upper dielectric layer 5, a reflective layer 6 and a protective layer 7 were provided on the surface of the substrate to construct an optical recording disk of such an architecture as shown in FIG. 1. The grooves were formed at a width of 0.74 μm, a depth of 650 Å, and a pitch of 1.48 μm.

The lower dielectric layer 3 was formed by a sputtering process using ZnS and $SiO_2$ as a target, wherein $SiO_2/(ZnS+SiO_2)$ was 15 mol %. The lower dielectric layer 3 had a refractive index of 2.33 at 780 nm wavelength, and a thickness of 2,000 Å.

Then, a thin film form of optical recording material was formed into the recording layer, as in Example 1.

The upper dielectric layer 5, formed as in the case of the lower dielectric layer 3, had a thickness of 200 Å.

The reflective layer 6, formed by a sputtering process using Au as a target, had a thickness of 1,500 Å. The protective layer 7 was formed by spin-coating an ultraviolet-curable type resin, and irradiating the resin with ultraviolet rays. The protective layer 7 had a thickness of 5 μm, as measured after curing.

The thus fabricated phase change type optical recording disk will hereinafter be called sample 1. Apart from this, sample 2 was prepared following sample 1 with the exception that a thin film form of optical recording material was formed into a recording layer, as in Example 2.

Next, each sample was initialized. Referring to initialization conditions, sample 1 was heat treated at 250° C. for 30 minutes as in Example 1, and sample 2 was heat treated at 250° C. for 1 hour as in Example 2.

The post-initialization reflectance was high in both samples, i.e., 23% in sample 1 and 25% in sample 2. In other words, the recording sensitivity was slightly higher in sample 1 than in sample 2. It is noted that by the "reflectance" used herein is intended a value of reflectance as found from the substrate side at 680 nm wavelength.

By measuring the optimum linear velocity at which each sample is rewritable, it was found to be 5.5 m/s in sample 1, and 6.0 m/s in sample 2. In the present disclosure, the linear velocity at which the rate of erasure is −25 dB or lower upon overwriting is defined as the rewritable optimum linear velocity. In this regard, it is noted that the rewritable optimum linear velocity was measured after 10 rewriting cycles.

Then, both samples were compared in terms of record/erase characteristics.

While each sample just after initialization was rotated at the rewritable optimum linear velocity, a 1–7 modulated signal was recorded with a recording power of 10 mW and an erasing power of 5 mW. As a result, the degrees of modulation of both samples were satisfactorily high; those of samples 1 and 2 were 55% and 61%, respectively.

Each sample was subjected to repeated rewriting. The rate of erasure in sample 1 remained unstable until three rewriting cycles. More specifically, the rate of erasure was −21 dB at the first cycle, and −31 dB upon stabilization. On the other hand, the rate of erasure in sample 2 was already stabilized at −33 dB at the first cycle. The rates of erasure in both samples were stabilized until about 10,000 rewriting cycles.

The advantages of the present invention can be evident from the results of the examples given above.

Japanese Patent Application No. 346749/1996 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What we claim is:

1. An optical recording material which has a composition, in atomic ratio, represented by

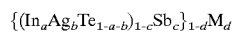
$$\{(In_aAg_bTe_{1-a-b})_{1-c}Sb_c\}_{1-d}M_d$$

where M is at least one element selected from the group consisting of hydrogen, silicon, carbon, vanadium, tungsten, tantalum, zinc, titanium, cerium, terbium, and yttrium, a=0.1 to 0.3, b=0.1 to 0.3, c=0.5 to 0.8, and d=0 to 0.05, and wherein, in a Raman spectrum thereof, there are a scattering peak I-1 having a Raman shift in a range of 113 to 117 $cm^{-1}$ and a scattering peak I-2 having a Raman shift in a range of 123 to 127 $cm^{-1}$, said scattering peak I-2 being larger in half-width than said scattering peak I-1.

2. The optical recording material of claim 1, wherein, in the Raman spectrum, there is further a scattering peak I-3 having a Raman shift in a range of 170 to 185 $cm^{-1}$, with an intensity of said scattering peak I-3 being up to 0.25 times those of said scattering peaks I-1 and I-2.

3. An optical recording medium comprising a recording layer formed of an optical recording material as recited in claim 1.

4. An optical recording material which has a composition, in atomic ratio, represented by

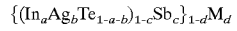
$$\{(In_aAg_bTe_{1-a-b})_{1-c}Sb_c\}_{1-d}M_d$$

where M is at least one element selected from the group consisting of hydrogen, silicon, carbon, vanadium, tungsten, tantalum, zinc, titanium, cerium, terbium, and yttrium, a=0.1 to 0.3, b=0.1 to 0.3, c=0.5 to 0.8, and d=0 to 0.05, and wherein, in a Raman spectrum thereof, there are a scattering peak II-1 having a Raman shift in a range of 105 to 125 $cm^{-1}$ and a scattering peak II-2 having a Raman shift in a range of 140 to 160 $cm^{-1}$, said scattering peak II-1 being higher in intensity than said scattering peak II-2.

5. An optical recording medium comprising a recording layer formed of an optical recording material as recited in claim 4.

* * * * *